(12) United States Patent
Napa et al.

(10) Patent No.: US 12,169,434 B2
(45) Date of Patent: Dec. 17, 2024

(54) SYSTEM, METHOD, AND COMPUTER PROGRAM TO IMPROVE SITE RELIABILITY ENGINEERING OBSERVABILITY

(71) Applicant: JPMorgan Chase Bank, N.A., New York, NY (US)

(72) Inventors: Mahesh Napa, Secaucus, NJ (US); Gordon Robert MacDonald, Glasgow (GB); Mark Leslie Gibbons, Kent (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 23 days.

(21) Appl. No.: 18/105,052

(22) Filed: Feb. 2, 2023

(65) Prior Publication Data
US 2024/0264894 A1 Aug. 8, 2024

(51) Int. Cl.
*G06F 11/07* (2006.01)
*G06F 9/54* (2006.01)

(52) U.S. Cl.
CPC ............ *G06F 11/079* (2013.01); *G06F 9/542* (2013.01); *G06F 11/0778* (2013.01)

(58) Field of Classification Search
CPC ..... G06F 11/079; G06F 9/542; G06F 11/0778
USPC ........................................................ 714/38.1
See application file for complete search history.

(56) References Cited

U.S. PATENT DOCUMENTS

| | | | |
|---|---|---|---|
| 2020/0272428 A1* | 8/2020 | Katakam | .................. G06F 8/71 |
| 2022/0237102 A1* | 7/2022 | Bugdayci | .............. G06F 11/327 |

* cited by examiner

*Primary Examiner* — Yair Leibovich
(74) *Attorney, Agent, or Firm* — GREENBLUM & BERNSTEIN, P.L.C.

(57) ABSTRACT

Various methods, apparatuses/systems, and media for improving SRE observability are disclosed. A processor defines a schema in a common manner; causes any application included across a distributed set of applications to utilize the schema to describe an error associated with a downstream application such that root failing component associated with the error is always at a bottom error frame in a response; implements a common structure for distributed error propagation in a chain of applications across the distributed set of applications in connection with the error message; generates error logs received from the chain of applications; stores the error logs in a centralized location accessible by all SRE users and application owners; calls a corresponding application programing interface (API) to access the error logs from the centralized location for utilizing in remediation.

20 Claims, 12 Drawing Sheets

```
{
    "jobId": "7a3838ee-6b35-44f8-a208-aaff4b30fb50",
    "batchId": "3b1ff30e70ae696-1528494455c0f02-f1d7129b88127239",
    "hostName": "iaasn0297128.nam.jpmchase.net",
    "status": "FAILED",
    "errorCode": "VERUM-8945",
    "errorStack": [
        {
            "errorSource": "VERUM",
            "errorCode": "VERUM-8945",
            "errorCodeDescription": "Blueprint failed due to backend AAAS failure",
            "errorMessage": "Blueprint failed due to backend AAAS unable to discover host in Verum",
            "errorCategory": "SYSTEM",
            "errorCodeURL": "http://verum.galacloud.jpmchase.net/errorcodeinfo/VERUM-8945",
            "errorSourceAPIVersion": "",
            "additionalInfo": {
                "blueprintName": "myappblueprint",
                "blueprintID": "58791",
                "supportQueue": "go/blueprintsupport",
                "retriesAttempted": "",
                "operationRetriable": "1",
                "errorSpanid": "VXXX12343243325456"
            }
        }
    ]
}
```

FIG. 6

```
700
{
    "status": "FAILED",
    "errorCode": "VERUM-8945",
    "errorStack": [
        {
            "errorSource": "VERUM",
            "errorCode": "VERUM-8945",
            "errorCodeDescription": "Host not registered in Verum",
            "errorMessage": "Host not registered in Verum or not available in the recent replication",
            "errorCategory": "SYSTEM",
            "errorCodeURL": "http://verum.jpmchase.net/errorCodeinfo/VERUM-8945",
            "errorSourceAPIversion": "",
            "additionalInfo": {
                "hostName": "iaasn00397128.nana.jpmchase.net",
                "hostIP": "165.191.121.905",
                "supportQueue": "gp/verumsupport",
                "operationRetriable": "1"
                "errorSpanId": "VXXX1234324343325456"
            }
        ...
    ]
    ...
}
```

```
{
    "jobId": "7a3833ee-6b35-44f8-a209-aaff4b304b50",
    "batchId": "3b1ff30e7cae696-153d8494450f03-f1d7293b88127239",
    "hostName": "iaasn00297128.name.jpmchase.net",
    "status": "FAILED",
    "errorCode": "VERUM-8945, AAAS-2113, CBP-8798 ",
    "createdDate": "2021-03-26T23:55:45",
    "executorLastModifiedDate": "2021-03-27T00:11:07",
    "executionTimeInMillis": 922000,
    "errorStack": [
        {
            "errorSource": "VERUM",
            "errorCode": "VERUM-8945",
            "errorCodeDescription": "Host not registered in Verum",
            "errorMessage": "Host not registered in Verum or not available in the recent replication",
            "errorCategory": "SYSTEM",
            "errorCodeURL": "http://verum.jpmchase.net/errorCodeInfo/VERUM-8945",
            "errorSourceAPIVersion": "",
            "additionalInfo": {
                "hostName": "iaasn00297128.name.jpmchase.net",
                "hostIP": "165.131.121.905",
                "supportQueue": "go/verumsupport",
                "operationRetriable":"1"
            }
        }
    ]
}
```

SYSTEM, METHOD, AND COMPUTER PROGRAM TO IMPROVE SITE RELIABILITY ENGINEERING OBSERVABILITY

TECHNICAL FIELD

This disclosure generally relates to data processing, and, more particularly, to methods and apparatuses for implementing a specification, platform, language, and cloud agnostic site reliability engineering (SRE) observability improving module configured to utilize standardized error codes and distributed error propagation for improving SRE observability.

BACKGROUND

The developments described in this section are known to the inventors. However, unless otherwise indicated, it should not be assumed that any of the developments described in this section qualify as prior art merely by virtue of their inclusion in this section, or that these developments are known to a person of ordinary skill in the art.

Today, a wide variety of business functions are commonly supported by software applications and tools, i.e., business intelligence (BI) tools. For instance, software has been directed to data processing, data migration, monitoring, performance analysis, project tracking, and competitive analysis, to name but a few. SRE is a set of principles and practices that incorporates aspects of software engineering and applies them to infrastructure and operations problems. The main goals for an SRE are to create scalable and highly reliable software systems.

VSI is a product and VSI Service is an enabling service for the VSI Product. End customers or referred as users request virtual machines by calling the VSI Service. VSI Service internally calls multiple applications some of which are internal to the VSI Service (VMS, Magister, etc.) and some applications (AAAS, CBP, etc.) which are external to the VSI Service.

Typical SRE user journey may include the following: as an SRE user, in order to diagnose a VSI operation (i.e., provision, apply blueprint, repave), one may need to review failures and analyze verbose log messages across multiple failing applications (e.g., Magister, CBP, and other applications) to understand the root failing component and reason for failure. According to today's conventional process, each application follows its own error coding standards and reports to its own streams (i.e., Application Programming Interface (API) error response, log response, event response, etc.). It takes considerable effort and time to understand the flow of the user business transaction across these applications, in order to correlate the error and diagnose the actual failing application and its component. This conventional process may prove to be extremely time consuming, requiring human knowledge of the applications, and therefore, not scalable for operations like a large scale datacenter event. Moreover, as an SRE user, one may not have access to all the logs for all these applications in a centralized place which allows the user to process and use automation to drive intelligent analysis, reporting and corrective remediation.

Thus, there is a need for an advanced tool that can improve SRE observability and the time taken to effectively and accurately identify the failing application and the root cause.

SUMMARY

The present disclosure, through one or more of its various aspects, embodiments, and/or specific features or sub-components, provides, among other features, various systems, servers, devices, methods, media, programs, and platforms for implementing a specification, platform, language, and cloud agnostic SRE observability improving module configured to utilize standardized error codes and distributed error propagation for improving SRE observability, but the disclosure is not limited thereto.

For example, the present disclosure, through one or more of its various aspects, embodiments, and/or specific features or sub-components, provides, among other features, various systems, servers, devices, methods, media, programs, and platforms for implementing a platform, language, and cloud agnostic SRE observability improving module configured to allow an SRE user, via a graphical user interface (GUI), to diagnose a failure across a distributed set of applications, to view the end user business transaction failure message and receive the root failing component and actionable failure message, while the transaction is processed and moves across inter-connected applications and their components, to allow the SRE user to directly engage the accountable application SRE team and resolve the issue or open a ticket; beyond the actionable failure message, mark the flow of the user transaction across the applications; transmit a precise and sufficient error message to the GUI to enable the SRE user to pinpoint the failing application, the failing component and what can be done to resolve the failure; transmit consistent error frames from all downstream applications to the GUI to provide a comprehensive log of what, where, and when an error has occurred, etc., but the disclosure is not limited thereto. Alternatively, the GUI is not necessarily needed to identify. An SRE can check the logs and point at the failing application/root cause instead of utilizing the GUI.

According to exemplary embodiments, a method for improving SRE observability by utilizing one or more processors along with allocated memory is disclosed. The method may include: defining a schema in a common manner; causing any application included across a distributed set of applications to utilize the schema to describe an error associated with a downstream application such that root failing component associated with the error is always at a bottom error frame in a response; implementing a common structure for distributed error propagation in a chain of applications across the distributed set of applications in connection with the error message; generating error logs received from the chain of applications; if needed, storing the error logs in a centralized location accessible by all SRE users and application owners; calling a corresponding API to access the error logs from the centralized location and display the error logs; and automatically implementing a remedial algorithm to correct the root failing component of the error message identified in the error logs.

According to exemplary embodiments, in defining the schema in a common manner, the method may further include: defining standardized error schema independently by each application across the distributed set of applications.

According to exemplary embodiments, the standardized error schema may provide a set of guidelines and guardrails for standardizing error codes while still providing a flexibility to an application owner to define and manage his/her own error codes.

According to exemplary embodiments, the method may further include: calling corresponding API by each application to communicate error response to each other among the distributed set of applications.

According to exemplary embodiments, the method may further include: standardizing the common structure for the distributed error propagation in a manner such that each application among the distributed set of applications can participate in the distributed error reporting while providing its own contextualization of the error message.

According to exemplary embodiments, the centralized location may be a centralized server, or a centralized database, or a centralized memory, but the disclosure is not limited thereto.

According to exemplary embodiments, the method may further include: receiving consistent error frames from all downstream applications across the distributed set of applications that provide the error logs that describe what, where and when the error has occurred; and propagating the error to upstream applications across the distributed set of applications.

According to exemplary embodiments, the method may further include: implementing an artificial intelligence (AI)/machine learning (ML) algorithm to capture all error logs and the error codes from the downstream applications in the chain of application; generating the error logs based on the captured error codes; and implementing a self-healing algorithm to correct the root failing component of the error message identified in the error logs.

According to exemplary embodiments, the method may further include: implementing an artificial intelligence (AI)/machine learning (ML) algorithm to capture all error logs, error codes, from the downstream applications in the chain of application; and implementing a inventory of previous remediations using the self-healing algorithm; and generating patterns of known error codes and error logs; and implementing a AL/ML logic which will use those known patterns to predict future error conditions and take preventative remedial steps to prevent the errors from occurrence.

According to exemplary embodiments, a system for improving SRE observability is disclosed. The system may include: a processor; and a memory operatively connected to the processor via a communication interface, the memory storing computer readable instructions, when executed, may cause the processor to: define a schema in a common manner; cause any application included across a distributed set of applications to utilize the schema to describe an error associated with a downstream application such that root failing component associated with the error is always at a bottom error frame in a response; implement a common structure for distributed error propagation in a chain of applications across the distributed set of applications in connection with the error message; generate error logs received from the chain of applications; store the error logs in a centralized location accessible by all SRE users and application owners; call a corresponding API to access the error logs from the centralized location and display the error logs; and automatically implement a remedial algorithm to correct the root failing component of the error message identified in the error logs.

According to exemplary embodiments, in defining the schema in a common manner, the processor is further configured to: define standardized error schema independently by each application across the distributed set of applications.

According to exemplary embodiments, the processor is further configured to: call corresponding API by each application to communicate error response to each other among the distributed set of applications.

According to exemplary embodiments, the processor is further configured to: standardize the common structure for the distributed error propagation in a manner such that each application among the distributed set of applications can participate in the distributed error reporting while providing its own contextualization of the error message.

According to exemplary embodiments, the processor is further configured to: receive consistent error frames from all downstream applications across the distributed set of applications that provide the error logs that describe what, where and when the error has occurred; and propagate the error to upstream applications across the distributed set of applications.

According to exemplary embodiments, the processor is further configured to: implement an AI/ML algorithm to capture all error codes from the downstream applications in the chain of application; generate the error logs based on the captured error codes; and implement a self-healing algorithm to correct the root failing component of the error message identified in the error logs.

According to exemplary embodiments, a non-transitory computer readable medium configured to store instructions for improving SRE observability is disclosed. The instructions, when executed, may cause a processor to perform the following: defining a schema in a common manner; causing any application included across a distributed set of applications to utilize the schema to describe an error associated with a downstream application such that root failing component associated with the error is always at a bottom error frame in a response; implementing a common structure for distributed error propagation in a chain of applications across the distributed set of applications in connection with the error message; generating error logs received from the chain of applications; storing the error logs in a centralized location accessible by all SRE users and application owners; calling a corresponding API to access the error logs from the centralized location and display the error logs; and automatically implementing a remedial algorithm to correct the root failing component of the error message identified in the error logs.

According to exemplary embodiments, in defining the schema in a common manner, the instructions, when executed, may further cause the processor to perform the following: defining standardized error schema independently by each application across the distributed set of applications.

According to exemplary embodiments, the instructions, when executed, may further cause the processor to perform the following: calling corresponding API by each application to communicate error response to each other among the distributed set of applications.

According to exemplary embodiments, the instructions, when executed, may further cause the processor to perform the following: standardizing the common structure for the distributed error propagation in a manner such that each application among the distributed set of applications can participate in the distributed error reporting while providing its own contextualization of the error message.

According to exemplary embodiments, the instructions, when executed, may further cause the processor to perform the following: receiving consistent error frames from all downstream applications across the distributed set of applications that provide the error logs that describe what, where and when the error has occurred; and propagating the error to upstream applications across the distributed set of applications.

According to exemplary embodiments, the instructions, when executed, may further cause the processor to perform the following: implementing an AI/ML algorithm to capture all error codes from the downstream applications in the chain of application; generating the error logs based on the captured error codes; and implementing a self-healing algorithm to correct the root failing component of the error message identified in the error logs.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 6 illustrates another exemplary schema for an exemplary application response as implemented by the specification, platform, language, and cloud agnostic SRE observability improving module of FIG. 4 in accordance with an exemplary embodiment.

FIG. 7 illustrates another exemplary schema for an exemplary error stack identified by a first application as implemented by the specification, platform, language, and cloud agnostic SRE observability improving module of FIG. 4 in accordance with an exemplary embodiment.

FIG. 8 illustrates another exemplary schema for an exemplary error stack identified by a second application that includes the error stack identified by the first application in a chain of applications as implemented by the specification, platform, language, and cloud agnostic SRE observability improving module of FIG. 4 in accordance with an exemplary embodiment.

FIG. 9 illustrates another exemplary schema for an exemplary error stack identified by a third application that includes the error stacks identified by the first application and the second application as implemented by the specification, platform, language, and cloud agnostic SRE observability improving module of FIG. 4 in accordance with an exemplary embodiment.

FIG. 10 illustrates another exemplary schema for an exemplary trail of reporting systems response as implemented by the specification, platform, language, and cloud agnostic SRE observability improving module of FIG. 4 in accordance with an exemplary embodiment.

FIG. 11 illustrates another exemplary schema for responding all error stacks as implemented by the specification, platform, language, and cloud agnostic SRE observability improving module of FIG. 4 in accordance with an exemplary embodiment.

DETAILED DESCRIPTION

Figure 1:
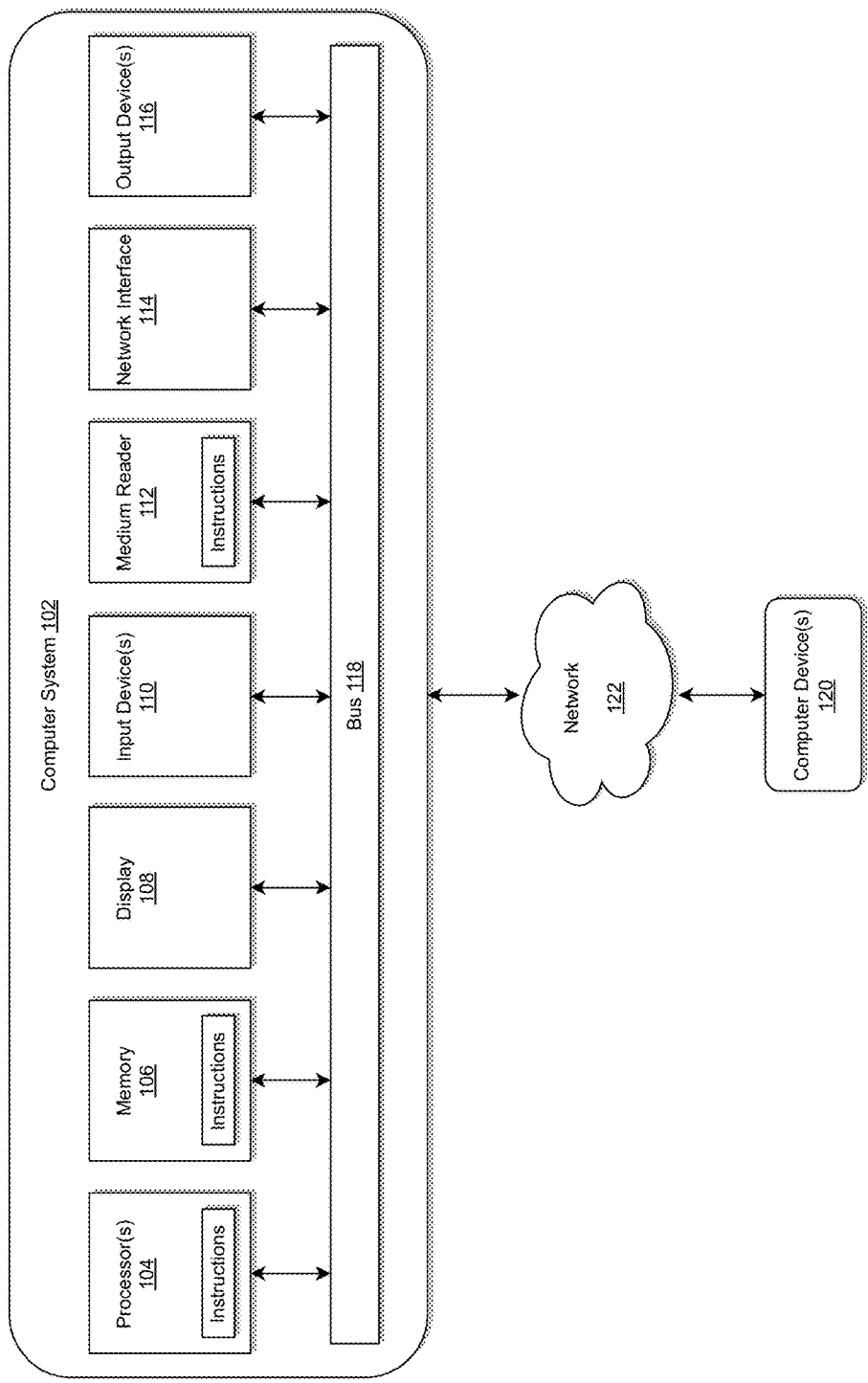
FIG. 1 illustrates a computer system for implementing a specification, platform, language, and cloud agnostic SRE observability improving module configured to utilize standardized error codes and distributed error propagation for improving SRE observability in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system 100 for use in implementing a specification, platform, language, and cloud agnostic SRE observability improving module configured to utilize standardized error codes and distributed error propagation for improving SRE observability in accordance with an exemplary embodiment. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, a visual positioning system (VPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

According to exemplary embodiments, the SRE observability improving module may be specification, platform, language, and cloud agnostic that may allow for consistent easy orchestration and passing of data through various components to output a desired result regardless of specification, platform, language, and cloud environment. Since the disclosed process, according to exemplary embodiments, is specification, platform, language, and cloud agnostic, the SRE observability improving module may be independently tuned or modified for optimal performance without affecting the configuration or data files. The configuration or data files, according to exemplary embodiments, may be written using JSON, but the disclosure is not limited thereto. For example, the configuration or data files may easily be extended to other readable file formats such as XML, YAML, etc., or any other configuration based languages.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
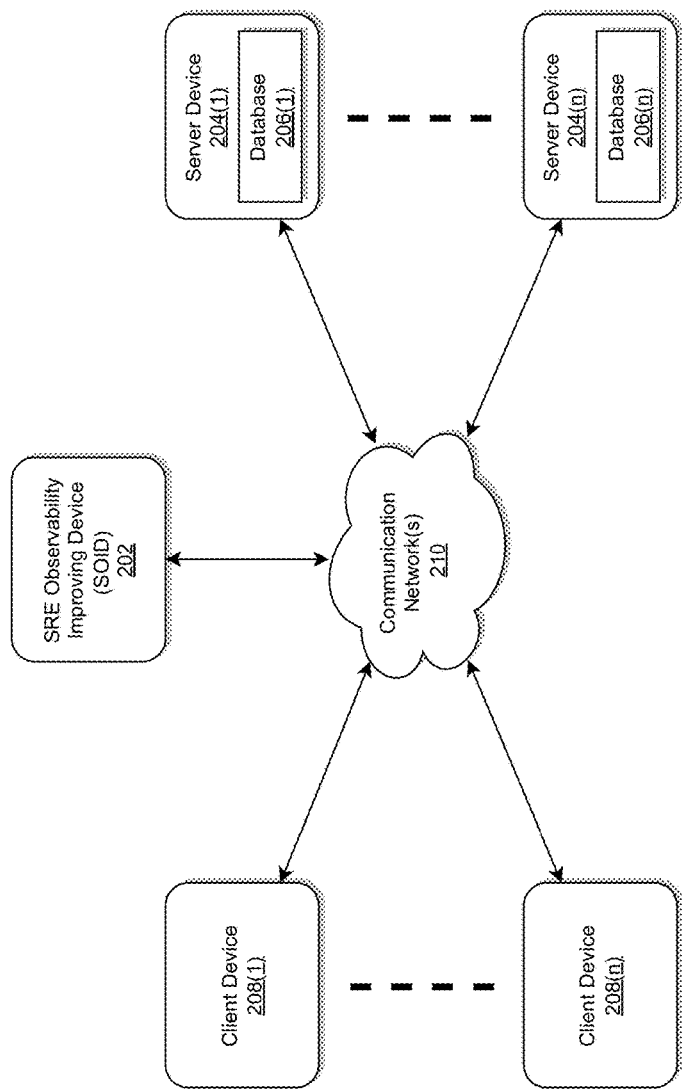
FIG. 2 illustrates an exemplary diagram of a network environment with a specification, platform, language, and cloud agnostic SRE observability improving device in accordance with an exemplary embodiment.

Referring to FIG. 2, a schematic of an exemplary network environment 200 for implementing a language, platform, and cloud agnostic SRE observability improving device (SOID) of the instant disclosure is illustrated.

According to exemplary embodiments, the above-described problems associated with conventional tools may be overcome by implementing an SOID 202 as illustrated in FIG. 2 that may be configured for implementing a specification, platform, language, and cloud agnostic SRE observability improving module configured to utilize standardized error codes and distributed error propagation for improving SRE observability, but the disclosure is not limited thereto. For example, the above-described problems associated with conventional tools may be overcome by implementing the SOID 202 as illustrated in FIG. 2 that may be configured to allow an SRE user via a graphical user interface (GUI), to diagnose a failure across a distributed set of applications, to view the end user business transaction failure message and receive the root failing component and actionable failure message, while the transaction is processed and moves across inter-connected applications and their components, to allow the SRE user to directly engage the accountable application SRE team and resolve the issue or open a ticket; beyond the actionable failure message, mark the flow of the user transaction across the applications; transmit a precise and sufficient error message to the GUI to enable the SRE user to pinpoint the failing application, the failing component and what can be done to resolve the failure; transmit consistent error frames from all downstream applications to the GUI to provide a comprehensive log of what, where, and when an error has occurred, etc., but the disclosure is not limited thereto.

The SOID 202 may be the same or similar to the computer system 102 as described with respect to FIG. 1.

The SOID 202 may store one or more applications that can include executable instructions that, when executed by the SOID 202, cause the SOID 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the SOID 202 itself, may be located in virtual server(s) running in a cloud-based computing environment rather than being tied to one or more specific physical network computing devices. Also, the application(s) may be running in one or more virtual machines (VMs) executing on the SOID 202. Additionally, in one or more embodiments of this technology, virtual machine(s) running on the SOID 202 may be managed or supervised by a hypervisor.

In the network environment 200 of FIG. 2, the SOID 202 is coupled to a plurality of server devices 204(1)-204(n) that hosts a plurality of databases 206(1)-206(n), and also to a plurality of client devices 208(1)-208(n) via communication network(s) 210. A communication interface of the SOID 202, such as the network interface 114 of the computer system 102 of FIG. 1, operatively couples and communicates between the SOID 202, the server devices 204(1)-204

(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the SOID 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The SOID 202 may be a standalone device or integrated with one or more other devices or apparatuses, such as one or more of the server devices 204(1)-204(n), for example. In one particular example, the SOID 202 may be hosted by one of the server devices 204(1)-204(n), and other arrangements are also possible. Moreover, one or more of the devices of the SOID 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the SOID 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the SOID 202 that may efficiently provide a platform for implementing a specification, platform, language, and cloud agnostic SRE observability improving module configured to utilize standardized error codes and distributed error propagation for improving SRE observability, but the disclosure is not limited thereto. For example, according to exemplary embodiments, the client devices 208(1)-208(n) in this example may include any type of computing device that can facilitate the implementation of the SOID 202 that may efficiently provide a platform for implementing a specification, platform, language, and cloud agnostic SRE observability improving module configured to: allow an SRE user via a GUI to diagnose a failure across a distributed set of applications, to view the end user business transaction failure message and receive the root failing component and actionable failure message, while the transaction is processed and moves across inter-connected applications and their components, to allow the SRE user to directly engage the accountable application SRE team and resolve the issue or open a ticket; beyond the actionable failure message, mark the flow of the user transaction across the applications; transmit a precise and sufficient error message to the GUI to enable the SRE user to pinpoint the failing application, the failing component and what can be done to resolve the failure; transmit consistent error frames from all downstream applications to the GUI to provide a comprehensive log of what, where, and when an error has occurred, etc., but the disclosure is not limited thereto.

The client devices 208(1)-208(n) may run interface applications, such as standard web browsers or standalone client applications, which may provide an interface to communicate with the SOID 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the SOID 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as may be appreciated by those skilled in the relevant art(s).

One or more of the devices depicted in the network environment 200, such as the SOID 202, the server devices 204(1)-204(n), or the client devices 208(1)-208(n), for example, may be configured to operate as virtual instances on the same physical machine. For example, one or more of the SOID 202, the server devices 204(1)-204(n), or the client devices 208(1)-208(n) may operate on the same physical device rather than as separate devices communicating through communication network(s) 210. Additionally, there may be more or fewer SOIDs 202, server devices 204(1)-204(n), or client devices 208(1)-208(n) than illustrated in FIG. 2. According to exemplary embodiments, the SOID 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
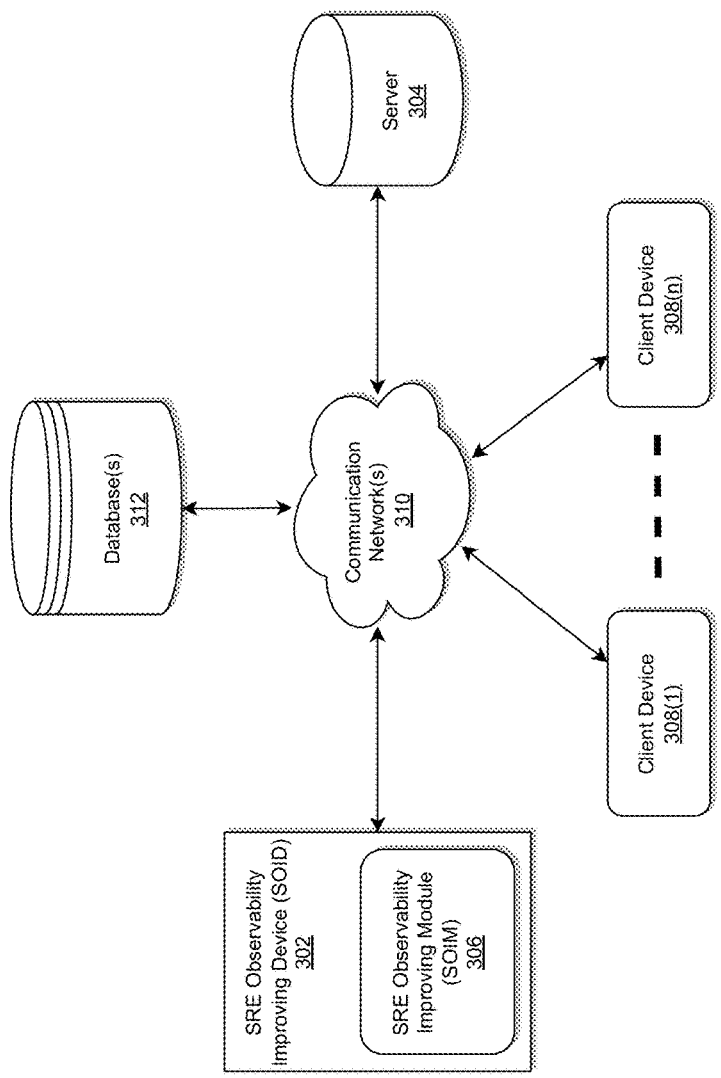
FIG. 3 illustrates a system diagram for implementing a specification, platform, language, and cloud agnostic SRE observability improving device having a platform, language, and cloud agnostic SRE observability improving module in accordance with an exemplary embodiment.

FIG. 3 illustrates a system diagram for implementing a specification, platform, language, and cloud agnostic SOID having a specification, platform, language, and cloud agnostic smart secret rotator module (SOIM) in accordance with an exemplary embodiment.

As illustrated in FIG. 3, the system 300 may include a SOID 302 within which an SOIM 306 is embedded, a server 304, a database(s) 312, a plurality of client devices 308(1) . . . 308(n), and a communication network 310.

According to exemplary embodiments, the SOID 302 including the SOIM 306 may be connected to the server 304, and the database(s) 312 via the communication network 310. The SOID 302 may also be connected to the plurality of client devices 308(1) . . . 308(n) via the communication network 310, but the disclosure is not limited thereto.

According to exemplary embodiment, the SOID 302 is described and shown in FIG. 3 as including the SOIM 306, although it may include other rules, policies, modules, databases, or applications, for example. According to exemplary embodiments, the database(s) 312 may be configured to store ready to use modules written for each API for all environments. Although only one database is illustrated in FIG. 3, the disclosure is not limited thereto. Any number of desired databases may be utilized for use in the disclosed invention herein. The database(s) may be a mainframe database, a log database that may produce programming for searching, monitoring, and analyzing machine-generated data via a web interface, etc., but the disclosure is not limited thereto.

According to exemplary embodiments, the SOIM 306 may be configured to receive real-time feed of data from the plurality of client devices 308(1) . . . 308(n) and secondary sources via the communication network 310.

As may be described below, the SOIM 306 may be configured to: define a schema in a common manner and display the schema onto a GUI; cause any application included across a distributed set of applications to utilize the schema to describe an error associated with a downstream application such that root failing component associated with the error is always at a bottom error frame in a response; implement a common structure for distributed error propagation in a chain of applications across the distributed set of applications in connection with the error message; generate error logs received from the chain of applications; store the error logs in a centralized location accessible by all SRE users and application owners; call a corresponding API to access the error logs from the centralized location and display the error logs onto the GUI; and automatically implement a remedial algorithm to correct the root failing component of the error message identified in the error logs, but the disclosure is not limited thereto.

The plurality of client devices 308(1) . . . 308(n) are illustrated as being in communication with the SOID 302. In this regard, the plurality of client devices 308(1) . . . 308(n) may be "clients" (e.g., customers) of the SOID 302 and are described herein as such. Nevertheless, it is to be known and understood that the plurality of client devices 308(1) . . . 308(n) need not necessarily be "clients" of the SOID 302, or any entity described in association therewith herein. Any additional or alternative relationship may exist between either or both of the plurality of client devices 308(1) . . . 308(n) and the SOID 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the SOID 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The SOID 302 may be the same or similar to the SOID 202 as described with respect to FIG. 2, including any features or combination of features described with respect thereto.

Figure 4:
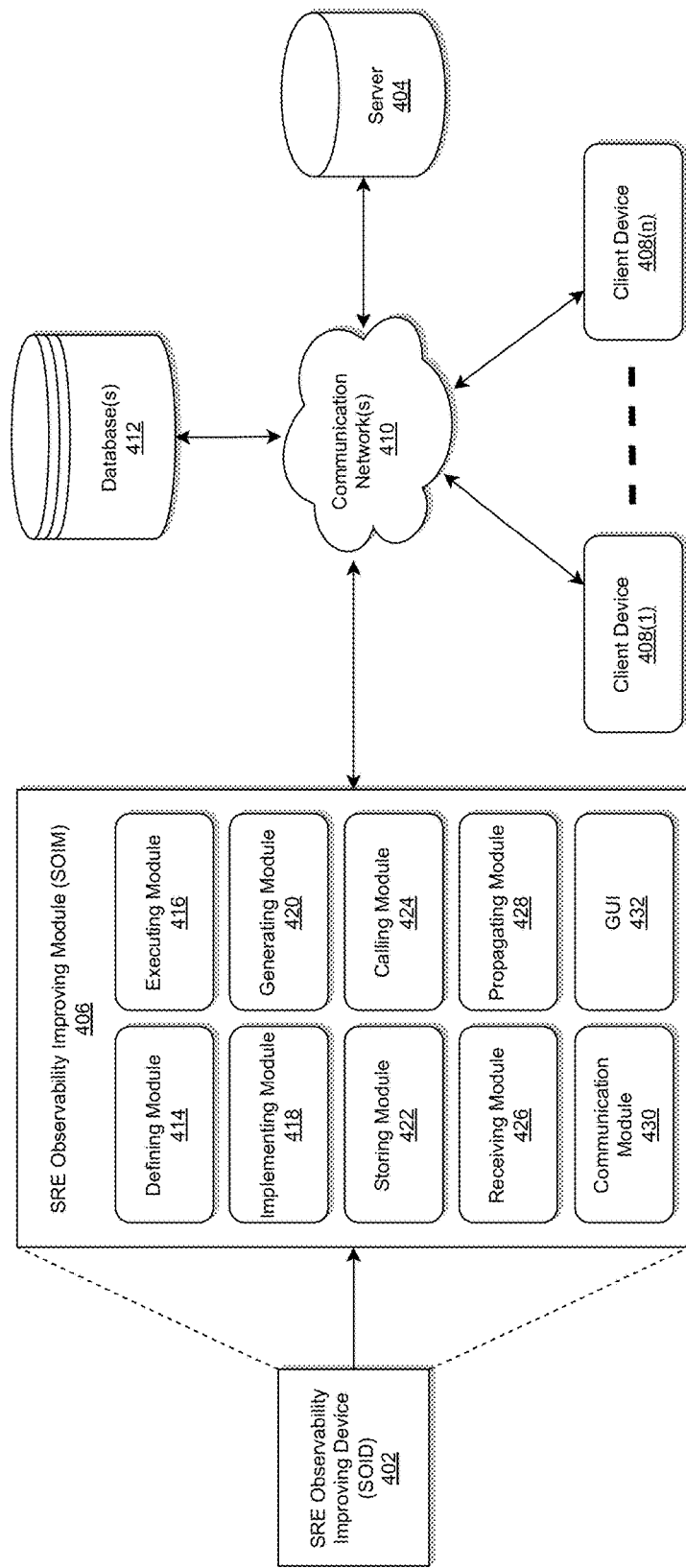
FIG. 4 illustrates a system diagram for implementing a specification, platform, language, and cloud agnostic SRE observability improving module of FIG. 3 in accordance with an exemplary embodiment.

FIG. 4 illustrates a system diagram for implementing a specification, platform, language, and cloud agnostic SOIM of FIG. 3 in accordance with an exemplary embodiment.

According to exemplary embodiments, the system 400 may include a specification, platform, language, and cloud agnostic SOID 402 within which a specification, platform, language, and cloud agnostic SOIM 406 is embedded, a server 404, database(s) 412, and a communication network 410. According to exemplary embodiments, server 404 may comprise a plurality of servers located centrally or located in different locations, but the disclosure is not limited thereto.

According to exemplary embodiments, the SOID 402 including the SOIM 406 may be connected to the server 404 and the database(s) 412 via the communication network 410. The SOID 402 may also be connected to the plurality of client devices 408(1)-408(n) via the communication network 410, but the disclosure is not limited thereto. The SOIM 406, the server 404, the plurality of client devices 408(1)-408(n), the database(s) 412, the communication network 410 as illustrated in FIG. 4 may be the same or similar to the SOIM 306, the server 304, the plurality of client devices 308(1)-308(n), the database(s) 312, the communication network 310, respectively, as illustrated in FIG. 3.

According to exemplary embodiments, as illustrated in FIG. 4, the SOIM 406 may include a defining module 414, an executing module 416, an implementing module 418, a generating module 420, a storing module 422, a calling module 424, a receiving module 426, a propagating module 428, a communication module 430, and a GUI 432. According to exemplary embodiments, interactions and data exchange among these modules included in the SOIM 406 provide the advantageous effects of the disclosed invention. Functionalities of each module of FIG. 4 may be described in detail below with reference to FIGS. 4-12.

According to exemplary embodiments, each of the defining module 414, executing module 416, implementing module 418, generating module 420, storing module 422, calling module 424, receiving module 426, propagating module 428, and the communication module 430 of the SOIM 406 of FIG. 4 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

According to exemplary embodiments, each of the defining module 414, executing module 416, implementing module 418, generating module 420, storing module 422, calling module 424, receiving module 426, propagating module 428, and the communication module 430 of the SOIM 406 of FIG. 4 may be implemented by microprocessors or similar, and may be programmed using software (e.g., microcode) to perform various functions discussed herein and may optionally be driven by firmware and/or software.

Alternatively, according to exemplary embodiments, each of the defining module 414, executing module 416, implementing module 418, generating module 420, storing module 422, calling module 424, receiving module 426, propagating module 428, and the communication module 430 of the SOIM 406 of FIG. 4 may be implemented by dedicated hardware, or as a combination of dedicated hardware to perform some functions and a processor (e.g., one or more programmed microprocessors and associated circuitry) to perform other functions.

According to exemplary embodiments, each of the defining module 414, executing module 416, implementing module 418, generating module 420, storing module 422, calling module 424, receiving module 426, propagating module 428, and the communication module 430 of the SOIM 406 of FIG. 4 may be called via corresponding API.

According to exemplary embodiments, the process implemented by the SOIM 406 may be executed via the communication module 430 and the communication network 410, which may comprise plural networks as described above. For example, in an exemplary embodiment, the various components of the SOIM 406 may communicate with the server 404, and the database(s) 412 via the communication module 430 and the communication network 410. Of course, these embodiments are merely exemplary and are not limiting or exhaustive. The database(s) 412 may include the databases included within the private cloud and/or public cloud and the server 404 may include one or more servers within the private cloud and the public cloud.

Figure 5:
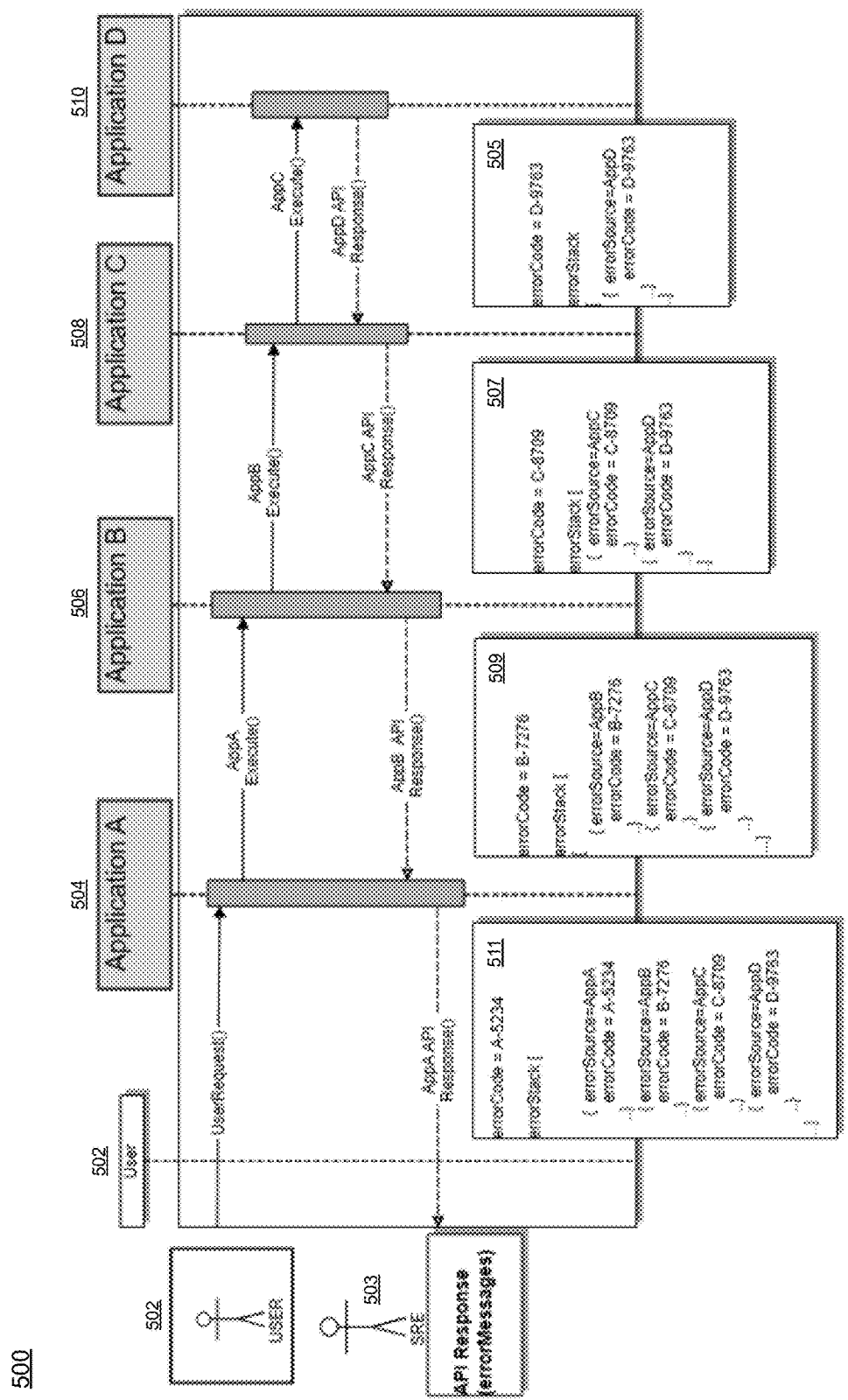
FIG. 5 illustrates an exemplary flow diagram as implemented by the specification, platform, language, and cloud agnostic SRE observability improving module of FIG. 4 in accordance with an exemplary embodiment.

FIG. 5 illustrates an exemplary flow diagram 500 implemented by the specification, platform, language, and cloud agnostic SOIM 406 of FIG. 4 in accordance with an exemplary embodiment. As illustrated in the exemplary architecture diagram 500 of FIG. 5, a stream of applications, e.g., application A 504, application B 506, application c 508, and application D 510 may be connected to each other as a chain of applications. According to exemplary embodiments, in the chain of applications, the application D 510 may be the last application in considering the downstream applications, and the application A 504 may be the first application considering the upstream applications, but the disclosure is not limited thereto. Any other arrangements of the applications may be possible without departing from the scope of the present application.

Referring back to FIGS. 4-5, the specification, platform, language, and cloud agnostic SOIM 406 may be configured to allow an SRE user 503 via the GUI 432, in order to diagnose a failure across a distributed set of applications, e.g., application A 504, application B 506, application c 508, and application D 510, etc., to view the end user 502 business transaction failure message and receive the root failing component and actionable failure message, while the transaction is processed and moves across inter-connected applications and their components, to allow the SRE user 503 to directly engage the accountable application SRE team and resolve the issue or open a ticket; beyond the actionable failure message, mark the flow of the user transaction across the applications; transmit a precise and sufficient error message to the GUI 432 to enable the SRE user 503 to pinpoint the failing application (i.e., in the exemplary flow diagram 500, application D 510), the failing component and what can be done to resolve the failure; transmit consistent error frames from all downstream applications to the GUI 432 to provide a comprehensive log of what, where, and when an error has occurred. For example, the error frame 505 received by the application C 508 from the application D 510; error frame 507 received by the application B 506 from the application C 508; the error frame 509 received by the application A 504 from the application B 506; and finally, the error frame 511 received by the SRE user 503 from the application A 504 may be transmitted to the GUI 432 to provide a comprehensive log of what, where, and when an error has occurred to the SRE user 503 so that the SRE user 503 can pinpoint the failing application (i.e., in the exemplary flow diagram 500, application D 510), the failing component and what can be done to resolve the failure, but the disclosure is not limited thereto.

According to exemplary embodiments, as illustrated in the flow diagram 500 of FIG. 5, when a user transaction error occurs during processing a transaction request requested by the user 502, the following error frames 505, 507, 509, and 511 are transmitted in a sequential manner. For example, the error frame 505 includes an error code D-9763 that explains why application D 510 has failed; the error frame 507 includes an error code C-8709 that explains why application C 508 has failed and that the reason for application C's 508 failure is actually the failure of application D 510 as explained in error code D-9763; the error frame 509 includes an error code B-7276 that explains why application B 506 has failed and that the reason for application B's 506 failure is actually the failure of application C 508 as explained in error code C-8709 which explains that the reason for application C's 508 failure is actually the failure of application D 510 as explained in error code D-9763; the error frame 511 includes an error code A-5234 which explains why application A 504 has failed and that the reason for application A' 504 failure is actually the failure of application B 506 as explained in the error code B-7276 that explains why application B 506 has failed and that the reason for application B's 506 failure is actually the failure of application C 508 as explained in error code C-8709 which explains that the reason for application C's 508 failure is actually the failure of application D 510 as explained in error code D-9763.

For example, referring back to FIGS. 4-5, according to exemplary embodiments, the defining module 414 may be configured to define a schema (i.e., see FIGS. 6-11) in a common manner and display the schema onto the GUI 432. The executing module 416 may be configured to cause any application included across a distributed set of applications, i.e., application A 504, application B 506, application C 508, and application D 510 to utilize the schema to describe an error associated with a downstream application such that root failing component associated with the error is always at a bottom error frame (i.e., error frame 505) in a response.

According to exemplary embodiments, the implementing module 418 may be configured to implement a common structure for distributed error propagation in a chain of applications across the distributed set of applications, i.e., application A 504, application B 506, application C 508, and application D 510 in connection with the error message.

According to exemplary embodiments, the generating module 420 may be configured to generate error logs received from the chain of applications, i.e., application A 504, application B 506, application C 508, and application D 510. The storing module 422 may be configured to store the error logs in a centralized location (i.e., either the database(s) 412 or the server 404) accessible by all SRE users 503 and application owners. The calling module 424 may be configured to call a corresponding API to access the error logs from the centralized location (i.e., either the database(s) 412 or the server 404) and display the error logs onto the GUI 432. The implementing module 418 may be configured to automatically implement a remedial algorithm to correct the root failing component of the error message identified in the error logs.

According to exemplary embodiments, in defining the schema in a common manner, the defining module 414 may be configured to define standardized error schema independently by each application across the distributed set of applications, i.e., application A 504, application B 506, application C 508, and application D 510. According to exemplary embodiments, the standardized error schema may provide a set of guidelines and guardrails for standardizing error codes while still providing a flexibility to an application owner to define and manage his/her own error codes.

According to exemplary embodiments, the calling module 424 may be configured to call corresponding API by each application to communicate error response to each other among the distributed set of applications, i.e., application A 504, application B 506, application C 508, and application D 510.

According to exemplary embodiments, the SOIM 406 may be further configured to standardize the common structure for the distributed error propagation in a manner such that each application among the distributed set of applications can participate in the distributed error reporting while providing its own contextualization of the error message. According to exemplary embodiments, the centralized location may be a centralized server, or a centralized database, or a centralized memory, but the disclosure is not limited thereto.

According to exemplary embodiments, the receiving module 426 may be configured to receive consistent error frames from all downstream applications across the distributed set of applications, i.e., application A 504, application B 506, application C 508, and application D 510, that provide the error logs that describe what, where and when the error has occurred; and the propagating module 428 may be configured to propagate the error to upstream applications across the distributed set of applications, i.e., application A 504, application B 506, application C 508, and application D 510 as described with reference to FIG. 5.

According to exemplary embodiments, the implementing module 418 may be further configured to: implement an AI/ML algorithm to capture all error codes (i.e., error codes D-9763, C-8709, B-7276, A-5234 as illustrated in FIG. 5) from the downstream applications in the chain of applications, i.e., application A 504, application B 506, application C 508, and application D 510; generate the error logs based on the captured error codes; and the implementing module 418 may be configured to implement a self-healing algorithm to correct the root failing component of the error message identified in the error logs (i.e., in this example, the root failing component of the error message identified in error code D-9763 associated with application D 510).

Referring back to FIGS. 4-11, there are specific use cases within the VSI flows which needed deliberation and inputs from SRE (consumers) and Application Developer (producers). FIGS. 6-11 illustrate corresponding schema implemented by the specification, platform, language, and cloud agnostic SOIM 406 of FIG. 4. These schemas ensure marking root cause of a component failure (i.e., marking a breadcrumb trail). This requirement is to ensure that one does not lose track of all the applications the user business transaction has traversed. Within VSI, similar to a distributed microservices architecture there is the transaction being executed at the same application during different stages of the workflow. For example, in a provision VSI flow, there may be errors from the same application at various junctions. For example, in a VSI provision flow, there are multiple calls to an application (i.e., Verum; an application created by the Assignee of the instant application) from different applications. Calls to Verum may fail during Magister-VMS ESR registration or during CBP-AAAS execution of the blueprint on the host. In this case, the errorSource and errorMessage will not provide SRE 503 a clear indication at which stage of the VSI provision flow the failure has occurred.

According to exemplary embodiments, based on the error code, the SRE 503 needs to know which application reported the failure and for which use case. For example, where a failure occurs during blueprint execution when AAAS is attempting to run a module and fails in Verum due to host not registered successfully. The descriptions as provided above with respect to FIG. 5 are exemplary options implemented by the SOIM 406 on how to report this error in Verum upstream back to Magister. In this example, decision stakeholders may include AAAS (Application A 504), Magister (Application B 506), CBP (Application C 508), VMS (Verum application: Application D 510).

According to exemplary embodiments as illustrated in FIGS. 4-11, exemplary schema elements may include errorSource, errorCode, errorMessage, and errorCategory. According to exemplary embodiments, the errorSource indicates the application which failed and is reporting the error along with its own error frame. The errorCode indicates application generated unique alpha-numeric code which can be referenced to provide information on the failed downstream application, component and type. The errorMessage indicates a detailed human-readable explanation of the error. May include verbose log output, but the disclosure is not limited thereto. The errorCategory indicates information if the failure originated from system or user input.

As illustrated in FIG. 5, the SOIM 406 may be configured to curate and include the response of all the downstream applications and preserve the context of the error as its reported upstream. This would provide a clean trail of the user business transaction to the SRE 503 and provide valuable information on the operation at each application layer. The errorSource may be used by a tool included in the SOIM 406 to create tickets in respective application's incident queue. SRE 503 may be able to traverse the curated ErrorFrames for each application, to easily retrieve the root failing application towards the end of the ErrorStack. In the below flow SRE can review the response to note application D 510 as the root failure with errorCode D-9763 and has the context of all the preceding operations using ErrorFrames from application A 504, application B 506, and application C 506.

FIG. 6 illustrates another exemplary schema 600 for an exemplary application response as implemented by the specification, platform, language, and cloud agnostic SOIM 406 of FIG. 4 in accordance with an exemplary embodiment. For example, the following can be easily identified by the SOIM 406 from the exemplary schema 600: "errorSource": "VERUM"; "errorCode": "VERUM-8945"; "errorCodeDescription": "Blueprint failed due to backend AAAS failure"; "errorMessage=" "Blueprint failed due to backend AAAS unable to discover host in Verum"; "errorCategory": "SYSTEM"; "errorCodeURL" etc., but the disclosure is not limited thereto.

An exemplary use case may include downstream errors and reporting system's adjusted error in response. In this use case, the focus is on all the errors. The benefit is that one gets a trail of all the application responses. In this example, the use case is that a user applying a blueprint on a host. In this use case the flow is CBP→AAASVerum, the SOIM 406 is reporting Verum failure, AAAS contextual response and CBP contextual response. Accordingly, the following technical improvements may be achieved by implementing the SOIM 406: all error details are captured and exposed. Information of errorCode and errorMessage is available at each of the components; remediation-retry, self-healing can be driven at any level; in this example, remediation can be at AAAS level (MS) using error code AAAS-2113 or at blueprint level using error code CBP-8798(retry); enables circuit breaker to implement kill switch at a specific use case (Magister node) as opposed to all use cases. In this use case, Verum is available for ESR registration but not for checking host registrations during blueprint executions, and therefore, the SOIM 406 can disable that specific service rather than enabling kill switch for Verum; provides better reporting at each layer, i.e., how many CBP-8798 errors have been reported in a week and how they are reducing over a period of two months, but the disclosure is not limited thereto. Verum reports its ErrorStack with its ErrorFrame.

FIG. 7 illustrates another exemplary schema 700 for an exemplary error stack identified by a first application as implemented by the specification, platform, language, and cloud agnostic SOIM 406 of FIG. 4 in accordance with an exemplary embodiment. For example, the following can be easily identified by the SOIM 406 from the exemplary schema 700: "errorSource": "VERUM"; "errorCode": "VERUM-8945"; "errorCodeDescription": "Host not registered in Verum""; "errorMessage=" "Host not registered in Verum or not available in the recent replication"; "errorCategory": "SYSTEM"; "errorCodeURL", etc. but the disclosure is not limited thereto.

AAAS extracts the ErrorFrame from Verum response and adds the AAAS ErrorFrame and reports the ErrorStack: [ErrorFrame from Verum+ErrorFrame of AAAS].

Figure 8:
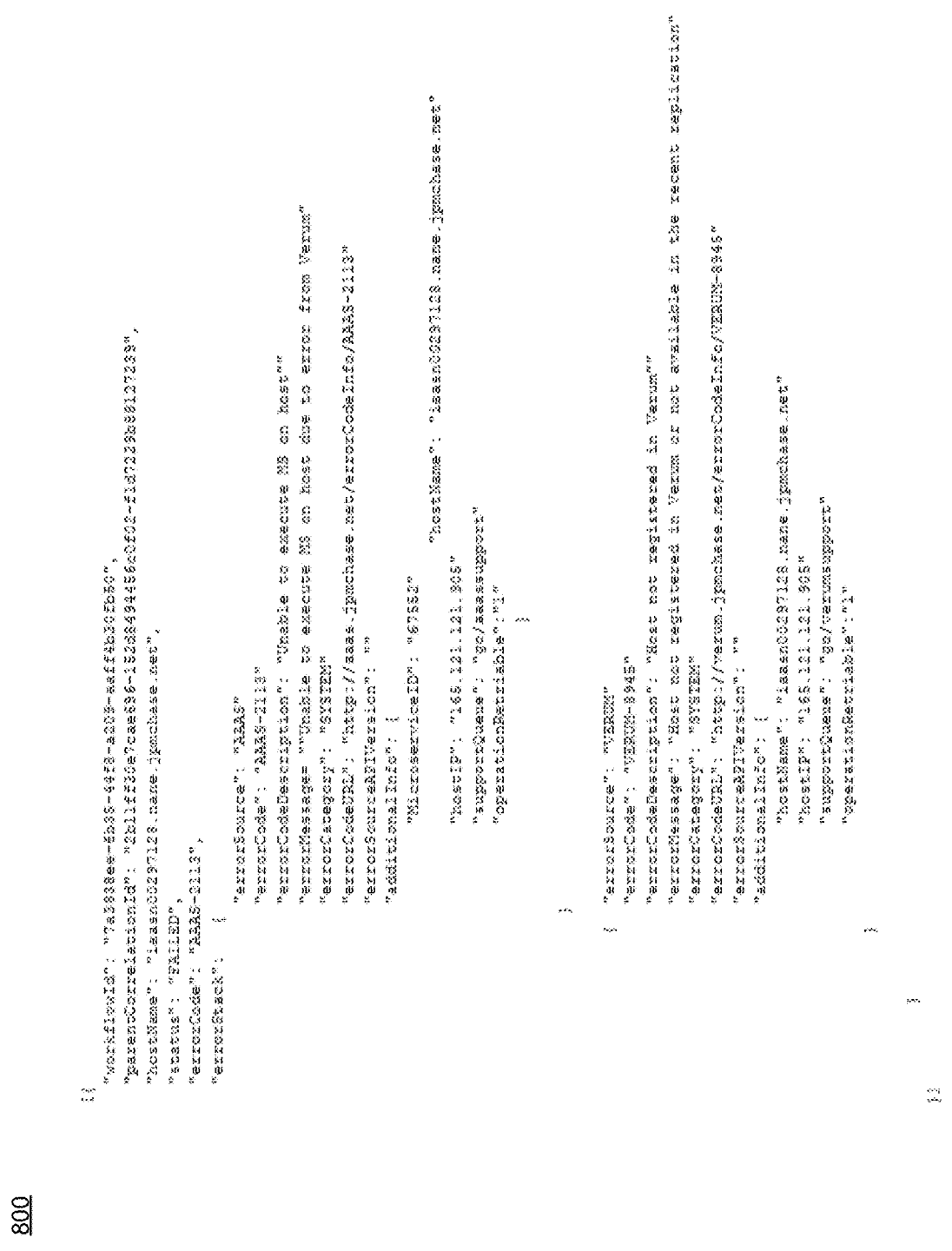

FIG. 8 illustrates another exemplary schema 800 for an exemplary error stack identified by a second application that includes the error stack identified by the first application in a chain of applications as implemented by the specification, platform, language, and cloud agnostic SOIM 406 of FIG. 4 in accordance with an exemplary embodiment. For example, the following can be easily identified by the SOIM 406 from the exemplary schema 800: "errorSource": "AAAS"; "errorCode": "AAAS-2113"; "errorCodeDescription": "Unable to execute MS on host""; "errorMessage=" "Unable to execute MS on host due to error from Verum"; "errorCategory": "SYSTEM"; "errorCodeURL", etc., and includes the schema as identified in FIG. 7, but the disclosure is not limited thereto.

CBP extracts the ErrorFrames from AAAS response and adds the CBP ErrorFrame and reports the ErrorStack [ErrorFrame from Verum+ErrorFrame from AAAS+ErrorFrame of CBP].

Figure 9:
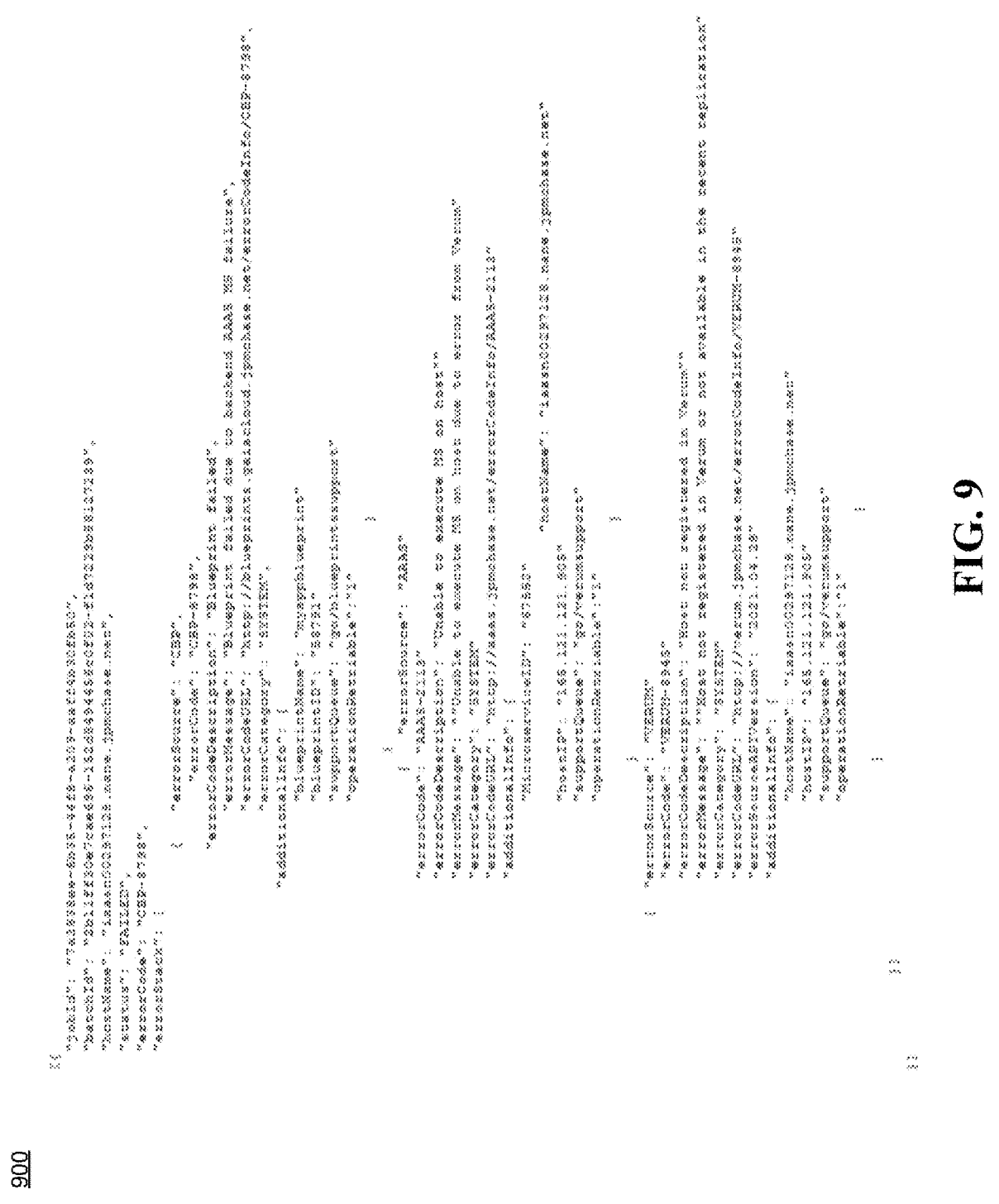

FIG. 9 illustrates another exemplary schema 900 for an exemplary error stack identified by a third application that includes the error stacks identified by the first application and the second application as implemented by the specification, platform, language, and cloud agnostic SOIM 406 of FIG. 4 in accordance with an exemplary embodiment. For example, the following can be easily identified by the SOIM 406 from the exemplary schema 900: "errorSource": "CBP", "errorCode": "CBP-8798", "errorCodeDescription": "Blueprint failed", "errorMessage": "Blueprint failed due to backend AAAS MS failure", "errorCodeURL", "errorCategory": "SYSTEM", etc., and includes the schemas as identified in FIGS. 7 and 8, but the disclosure is not limited thereto.

FIG. 10 illustrates another exemplary schema 1000 for an exemplary trail of reporting systems response as implemented by the specification, platform, language, and cloud agnostic SOIM 406 of FIG. 4 in accordance with an exemplary embodiment. For example, the following can be easily identified by the SOIM 406 from the exemplary schema 1000: "errorSource": "VERUM"; "errorCode": "VERUM-8945"; "errorCodeDescription": "Host not registered in Verum""; "errorMessage=" "Host not registered in Verum or not available in the recent replication"; "errorCategory": "SYSTEM"; "errorCodeURL"; "errorSourceAPI Version":"", etc., but the disclosure is not limited thereto.

FIG. 11 illustrates another exemplary schema 1100 for responding all error stacks as implemented by the specification, platform, language, and cloud agnostic SOIM 406 of FIG. 4 in accordance with an exemplary embodiment. For example, the following can be easily identified by the SOIM 406 from the exemplary schema 1100: "errorSource": "CBP", "errorCode": "CBP-8712", "errorCodeDescription": "Blueprint failed to execute due to multiple failures", "errorMessage": "Package Version not supported", "errorCodeURL", "errorCategory": "USER", etc., but the disclosure is not limited thereto. For example, this requirement of reporting all error stacks as implemented by the SOIM 406 of FIG. 4 ensures that in a VSI provisioning workflow which has multiple parallel executions, one does not lose track of all failures which the user business transaction has traversed. Within VSI, similar to a distributed microservices architecture, the user transaction may be orchestrated in parallel across components at any point in time. For example, in a provision VSI flow: VMS have parallel executions to (a) Create the VM (b) Run ESR Registration; CBP may have parallel executions to (a) AAAS execution (b) SCCM package installation; and CBP may have parallel executions to apply blueprint instance on multiple hosts.

In the event where parallel executions may fail independently, one needs all the errors reported back in the API response. This may enable SRE user 503 to understand all the errors and remediate before retrying the user business transaction again.

As discussed above, the decision stakeholders may include: AAAS, Magister, CBP, VMS. The SOIM 406 may be configured to report all errors from the downstream components and applications. Application API response should include all error responses from downstream components. When a single error occurs, application can respond with a list containing one error frame. If responding with multiple errors may be too complicated for applications, responding with the first or most significant error may be sufficient. The errorMessage should be succinct and the errorCode should report as multiple failures.

An exemplary use case may include blueprint response for single host where the blueprint spans multiple providers and fails. For example, as illustrated in FIG. 11, the blueprint may have AAAS provider stacks and SCCM provider stacks which are executed in parallel. There were two separate errors that occurred in the flow. In a scenario, where this use case is not available in CBP, the service which encounters multiple failures in executing the operation by the SOIM 406 may include the following: create an ErrorFrame; add the failures for the different operations into the additionalInfo field of the ErrorFrame; create a failure per op and add an errorCode and or errorStack per failure; create a new ErrorStack; push the ErrorFrame onto the ErrorStack; return the result with the ErrorStack in it, etc., but the disclosure is not limited thereto.

According to exemplary embodiments, application development teams adopting the SOIM 406 standard described herein for error code standardization and distributed error propagation should be compliant with the API Response. The applications could add their own additional attributes to their response. For example, the following descriptions illustrate exemplary API response for a given attribute or component, whether optional or mandatory, JSON type, and allowed values example.

For example, for "status," attribute or component description is as follows: the response status of the user business transaction from the downstream application to the calling application. The status accompanies the error code. According to exemplary embodiments, "status" may be optional and JSON type may be string. And allowed values or example is as follows: allowed length is up to 20 characters; status of the application will be decided by the application developer team. Sample values and definitions may include: SUCCESS or COMPLETED: The user business transaction or workflow was completed successfully and/or reported warnings.

According to exemplary embodiments, for "errorCode," attribute or component description is as follows: application generated unique alpha-numeric code which can be referenced to provide information on the failed downstream application, component and type. According to exemplary embodiments, "errorCode" may be optional, but errorCode may be mandatory in the error frame. JSON type may be string. And allowed values or example is as follows: allowed length is up to 35 characters. Each application implementing the SOIM 406 may manage and provide their own error codes. For example, AAAS-2213, MS5132, CBP-8901, DEPLOY9801. Applications may choose to use specific error code ranges for issue category, e.g., 1000-1999—SYSTEM Issues; 2000-2999—USER issues; 3000-3999—Execution issues.

According to exemplary embodiments, for "errorStack," attribute or component description is as follows: application generated array of Error frames. According to exemplary embodiments, "errorStack" may be mandatory and JSON type may be "Array<ErrorFrame>". And allowed values or example is as follows: Each application implementing the SOIM 406 must create an Error Frame of nested attributes. Application must follow the guidance to adhere to the distributed error propagation. Error Frame is of type JSON object and must follow the Error Frame schema described in below.

errorStack [{<Error_Frame>}, {<Error_Frame>}, {<Error_Frame>} ].

The Error Frame schema is described below. For example, the following descriptions illustrate exemplary Error Frame schema for a given attribute or component, whether optional or mandatory, JSON type, and allowed values example.

For example, for "version" is mandatory and JSON type is string. And allowed values or example for "version" is as follows: specifies the schema version that this ErrorFrame conforms to in the format: "X.Y.Z", e.g., version="1.1.1".

According to exemplary embodiments, for "errorSource," attribute or component description is as follows: the application which failed and is reporting the error along with its own error frame. According to exemplary embodiments, "errorSource" is mandatory, and JSON type is string. And allowed values or example is as follows: allowed length is up to 20 characters; possible applications which may participate may include: AaaS. Each application implementing the SOIM 406 will manage and provide their own unique errorSource name. Proposed: AIM, APM, BMS, BSS, CBP, Cohesity Control-M Data Protect DBaaSNow, DBaaSNow/ Moonraker, EMP, EPV, ESR, ESX, Genesis, GBI, GBI Automation Services, SQL, SRE, TBN, VCO, Verum, VMS, VCF, vCenter Web Build Windows, etc., which are examples of internal applications of the Applicant JPMorgan and Chase.

According to exemplary embodiments, for "errorCode," attribute or component description is as follows: application generated unique alpha-numeric code which can be referenced to provide information on the failed downstream application, component, and type. According to exemplary embodiments, "errorCode" is mandatory, and JSON type is string. And allowed values or example is as follows: allowed length is up to 35 characters. Each application implementing the SOIM 406 will manage and provide their own error codes. Example: AAAS-2213, MS5132, CBP-8901, DEPLOY9801. Applications may choose to use specific error code ranges for issue category, e.g., 1000-1999—SYSTEM Issues; 2000-2999—USER issues; 3000-3999—Execution issues.

According to exemplary embodiments, for "errorComponent," attribute or component description is as follows: an application can report the failure of a downstream application or provide details on a failing component using the errorComponent. This optional field is useful if the downstream applications have not yet implemented standards set forth herein with SOIM 406, and thus cannot propagate its own Error Frame or wish to identify a failing component. Useful also for applications which implement vendor APIs and cannot change the API response.

According to exemplary embodiments, "errorComponent" is optional, and JSON type is string. And allowed values or example is as follows: allowed length is up to 20 characters. Each application implementing the SOIM 406 will manage and provide their own list of errorComponents. If there is no errorComponent information to convey, then the field should just not be included as it is optional. Also, applications are able to use this field to communicate failure within an internal component e.g., a car could report that it is unable to start due to a failure of the water pump by using this field.

According to exemplary embodiments, for "errorCodeDescription," attribute or component description is as follows: A brief human-readable description qualifying the errorCode. Also referred as the Title. According to exemplary embodiments, "errorCodeDescription" is mandatory, and JSON type is string. And allowed values or example is as follows: 150 characters (approximately 25 words assuming 6 characters as the average size of a word), e.g., "Package not available"; "Insufficient privileges", etc.

According to exemplary embodiments, for "errorMessage," attribute or component description is as follows: A detailed human-readable explanation of the error. May include verbose log output. According to exemplary embodiments, "errorMessage" is mandatory, and JSON type is string.

Allowed values or example for "errorMessage" is as follows: allowed length is up to 600 characters (approximately 100 words assuming 6 characters as the average size of a word); applications can choose to add additional errorMessage details in the additionalInfo object; expectation is that SRE would use retrieve the event/log if more details on the error is required; for example, errorMessage; refer to status code for more details; Error: Root Error Message: Please provide valid change control ticket for execution PDPA (change control tickets) Numbers AP02285707, AP04308737 are assigned to this microservice; to execute against this PDPA, please provide PDPA Number: Child Error Objects:[{\"code\":null,\"message\":"; Please provide valid change control ticket for execution PDPA Numbers AP02285707, AP04308737 are assigned to this microservice; to execute against this PDPA, please provide PDPA Number.\",\"errorType\":\"EXECUTION\", \"identifier\":null,\"targetType\":null}]."

According to exemplary embodiments, for "errorCategory," attribute or component description is as follows: information if the failure originated from SYSTEM or USER input. According to exemplary embodiments, "errorCategory," is mandatory, and JSON type is string (enumeration). Allowed values or example for "errorCategory" is as follows: "SYSTEM", "USER". This will be useful for reporting tools like Fidum(go/fidum) to ensure observability on all system failure analytics separate from user failures. Examples of USER error in CBP would be providing a bad blueprint (blueprint with untested attributes). Examples of USER error in AAAS would be trying to execute a MS without subscribing to it.

According to exemplary embodiments, for "errorTimestamp," attribute or component description is as follows: a timestamp in UTC format of the error occurrence to enable serialization and deserialization and maintain the order of the Error frames in the Error Stack. According to exemplary embodiments, "errorTimestamp" is mandatory, and JSON type is string. Allowed values or example for "errorTimestamp" is as follows: will follow the firmwide UTC guidelines based on time zone. For example, the timestamp of 12 Apr. 1985 at 11:20 pm and 50.52 seconds at UTC would be formatted as follows: 1985-04-12T23:20:50.52Z.

According to exemplary embodiments, for "errorCodeURL," attribute or component description is as follows: a URL which would provide detailed description of the errorCode including potential workarounds. According to exemplary embodiments, "errorCodeURL" is optional, and JSON type is string. Allowed values or example for "errorCodeURL" is as follows: allowed length is up to 120 characters.

According to exemplary embodiments, for "additionalInfo," attribute or component description is as follows: an object with key values pairs, which can be used to include additional information by application developers to provide additional key identifiers on the error. According to exemplary embodiments, "additionalInfo" is optional, and JSON type is Map. Allowed values or example for "additionalInfo" is as follows: Allowed length is up to 2000 characters (approx. 330 words assuming 6 characters as the average size of a word). This is a useful object to allow application developers flexibility to include application contextualized information useful for their SRE and VSI SRE. Examples of optional attributes for specific applications which can be included: CBP—blueprintName, blueprintVersion, blueprintID; AAAS—MicroserviceID, MicroserviceType, Hostname; VMS—VMID, VMOSType, VMOSImage, Hostname; other optional attribute. The process will continue to review the additionalInfo object and move attributes which are commonly occurring here directly in the ErrorStack (e.g., Hostname/IP could be a commonly used attribute and may be moved as attribute of ErrorStack).

According to exemplary embodiments, for "additionalInfo.supportQueue," attribute or component description is as follows: the Service desk or Incident queue for the errorSource application. According to exemplary embodiments, "additionalInfo.supportQueue" is optional, and JSON type is string. Allowed values or example for "additionalInfo.supportQueue" is as follows: allowed length is up to 120 characters, e.g., go/aaashelp, go/blueprintsupport.

According to exemplary embodiments, for "additionalInfo.operationRetriable," attribute or component description is as follows: provides information if the operation or transaction or event may be retried by the upstream application assuming the error is recoverable. According to exemplary embodiments, "additionalInfo.operationRetriable" is optional, and JSON type is Boolean. Allowed values or example for "additionalInfo.operationRetriable" is as follows: "FALSE": if the error is non-recoverable and the operation cannot be retried; "TRUE": if the error is recoverable and the operation can be retried.

According to exemplary embodiments, for "additionalInfo.errorSourceAPIVersion," attribute or component description is as follows: provides information if the operation or transaction or event may be retried by the upstream application assuming the error is recoverable. According to exemplary embodiments, "additionalInfo.errorSourceAPIVersion" is optional, and JSON type is Boolean. Allowed values or example for "additionalInfo.error.SourceAPIVersion" is as follows: allowed length is up to 20 characters.

According to exemplary embodiments, based on the above technical design as implemented by the SOIM 406, it is important to lay out guidance to application teams on their implementation of the Error Code Standards. The following guidance includes certain "Must Have" items to insure the consistency and success of the SOIM 406 as implemented herein; certain "Should Have" items which are useful to incorporate for increased value to the SOIM 406, however application teams may choose to implement the "Should Have" items in a manner which is in support of all their extended use cases and not liable for major changes to their current application architecture state.

According to exemplary embodiments, "Must Have" aspect of the guidance is as follows.
1) All applications in the distributed system must aim to implement the Standard Error Framework.
2) Each application must create and publish their errorCode list which are relevant to their application use case and consumers' use case.
3) Each application must ensure the errorCodeDescription and errorMessage are succinct, human readable and in the spirit of SOIM 406—actionable by SRE, e.g., a. errorMessage limits must be honored (<600 characters) to ensure SRE is not flooded with verbose log with no context, b. additionalInfo (<2000 characters) should be used to include larger error messages.
4) Each Application must include all the ErrorFrames from the downstream Applications in a distributed Application flow, e.g., as the error is propagated upstream, each application must extract the ErrorStack from the downstream application, create its own ErrorFrame and add it to the top of the ErrorStack and respond upstream with the new ErrorStack. This will ensure SRE has context of the user business transaction being executed at every application as the error response traverses downstream.
5) Application API response must not modify any of the ErrorFrames it has received in an ErrorStack from downstream application with the exception of the contents of additionalInfo attributes which it is at liberty to delete if it determines that the size of the ErrorStack has grown excessive due to the size of additionalInfo attributes.
6) Application API response must include all failures from downstream components or applications which have failed independently in that flow. One can check exemplary use cases. This will ensure SRE can remediate all failures before retrying.
7) Application API must not rename or modify common HTTP Error Codes (500, 401, 403, 404).
8) Applications teams must not use errorTimestamp to sort the order of the Array elements or in any way change the order of the JSON array.

According to exemplary embodiments, "Should Have" aspect of the guidance is as follows.
1) Applications should expose user errors to AppDev consumers and obfuscate internal applications error. For example, blueprint failures due to backend Verum errors should not be exposed to AppDev consumer.
2) Applications should use the additionalInfo object to add additional attributes to their ErrorFrame relevant to their reporting use cases. These additional attributes are key identifiers for the failure and can be used to reference the error and assist in the diagnosis (e.g., hostname, blueprintname, AAAS Microservice ID, username). Benefits of these attributes are as follows.
   a. Explicitly defined yet flexible: Allows us to maintain a rigid error schema(errorStack) and at the same time flexibility for application teams to use the additionalInfo for application specific attributes.
   b. Easily parseable: Adding an additionalInfo object with key values pairs allows application to parse the additionalInfo object and retrieve information rather than including the attributes (e.g., hostname, MSID, blueprintName) in a verbose unstructured errorMessage.
   c. Future Proof: Keeps the error schema futureproof. As we continue to review and enhance our root error schema(errorStack), one can move attributes from additionalInfo to errorStack (e.g., hostname is a common attribute used across VSI applications—Magister, CBP, AAAS, VMS and can eventually be moved from additionalInfo object to be an attribute of errorStack).
3) The errorCategory for each Application should be published and approved to be used by SRE to classify USER error vs SYSTEM failures. Some applications may have additional values for this attribute which should be discussed with the SRE.
4) Application should never directly return more than one errorStack in a result i.e., there should only ever be an errorCode and errorStack attribute at the top level of the result.

Figure 12:
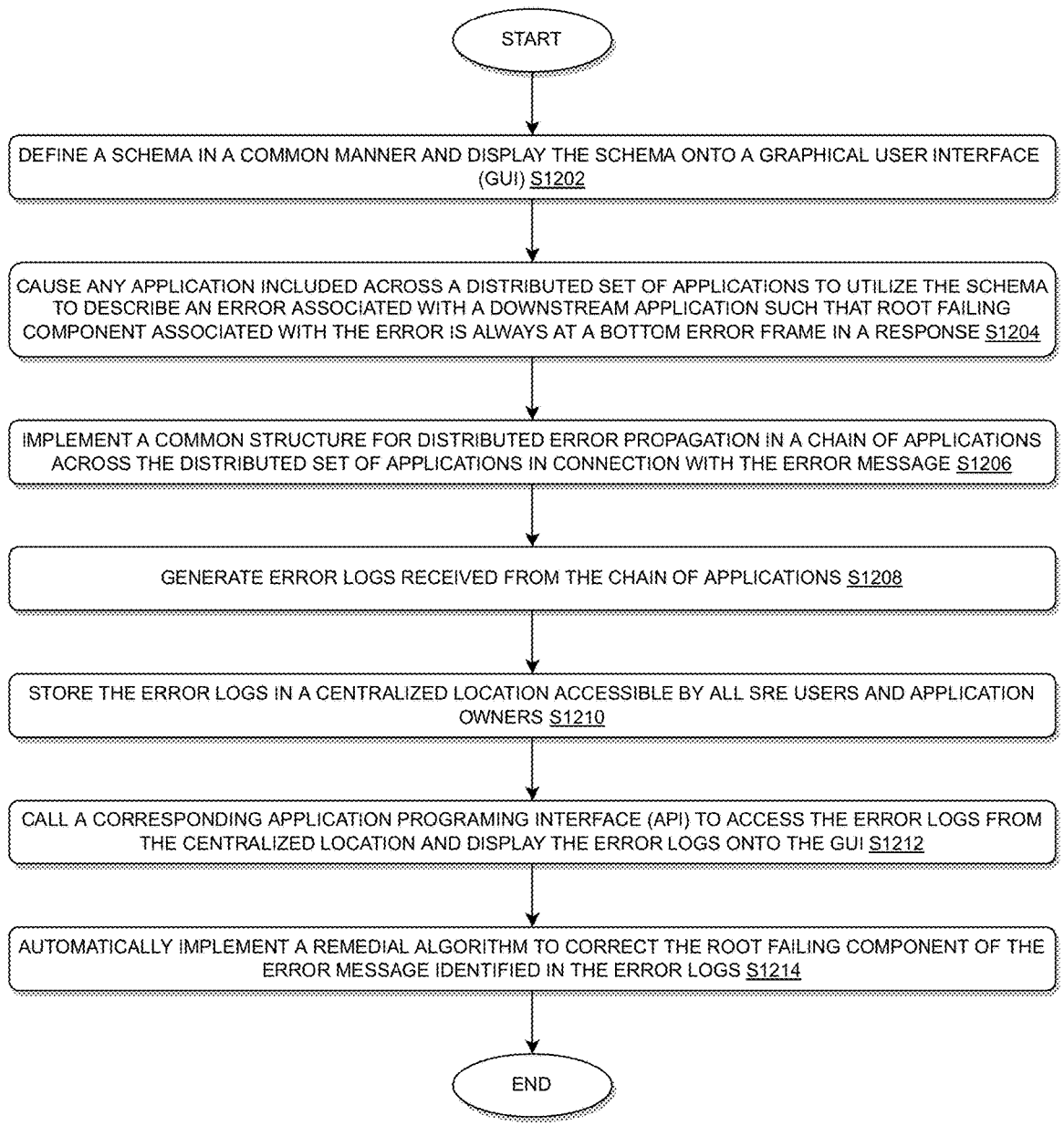
FIG. 12 illustrates an exemplary flow chart implemented by the specification, platform, language, and cloud agnostic SRE observability improving module of FIG. 4 for utilizing standardized error codes and distributed error propagation for improving SRE observability in accordance with an exemplary embodiment.

FIG. 12 illustrates an exemplary flow chart 1200 implemented by the specification, platform, language, and cloud agnostic SOIM 4012 of FIG. 4 for improving SRE observability in accordance with an exemplary embodiment. It may be appreciated that the illustrated process 1200 and associated steps may be performed in a different order, with illustrated steps omitted, with additional steps added, or with a combination of reordered, combined, omitted, or additional steps.

As illustrated in FIG. 12, at step S1202, the process 1200 may include defining a schema in a common manner and displaying the schema onto a GUI.

At step S1204, the process 1200 may include causing any application included across a distributed set of applications to utilize the schema to describe an error associated with a downstream application such that root failing component associated with the error is always at a bottom error frame in a response.

At step S1206, the process 1200 may include implementing a common structure for distributed error propagation in a chain of applications across the distributed set of applications in connection with the error message.

At step S1208, the process 1200 may include generating error logs received from the chain of applications.

At step S1210, the process 1200 may include storing the error logs in a centralized location accessible by all SRE users and application owners.

At step S1212, the process 1200 may include calling a corresponding API to access the error logs from the centralized location and display the error logs onto the GUI.

At step S1214, the process 1200 may include automatically implementing a remedial algorithm to correct the root failing component of the error message identified in the error logs.

According to exemplary embodiments, in defining the schema in a common manner, the process 1200 may further include: defining standardized error schema independently by each application across the distributed set of applications.

According to exemplary embodiments, in the process 1200, the standardized error schema may provide a set of guidelines and guardrails for standardizing error codes while still providing a flexibility to an application owner to define and manage his/her own error codes.

According to exemplary embodiments, the process 1200 may further include: calling corresponding API by each application to communicate error response to each other among the distributed set of applications.

According to exemplary embodiments, the process 1200 may further include: standardizing the common structure for the distributed error propagation in a manner such that each application among the distributed set of applications can participate in the distributed error reporting while providing its own contextualization of the error message.

According to exemplary embodiments, in the process 1200, the centralized location may be a centralized server, or a centralized database, or a centralized memory, but the disclosure is not limited thereto.

According to exemplary embodiments, the process 1200 may further include: receiving consistent error frames from all downstream applications across the distributed set of applications that provide the error logs that describe what, where and when the error has occurred; and propagating the error to upstream applications across the distributed set of applications.

According to exemplary embodiments, the process 1200 may further include: implementing an artificial intelligence (AI)/machine learning (ML) algorithm to capture all error codes from the downstream applications in the chain of application; generating the error logs based on the captured error codes; and implementing a self-healing algorithm to correct the root failing component of the error message identified in the error logs.

According to exemplary embodiments, the SOID 402 may include a memory (e.g., a memory 106 as illustrated in FIG. 1) which may be a non-transitory computer readable medium that may be configured to store instructions for implementing a specification, platform, language, and cloud agnostic SOIM 406 for improving SRE observability as disclosed herein. The SOID 402 may also include a medium reader (e.g., a medium reader 112 as illustrated in FIG. 1) which may be configured to read any one or more sets of instructions, e.g., software, from any of the memories described herein. The instructions, when executed by a processor embedded within the SOIM 406, or within the SOID 402, may be used to perform one or more of the methods and processes as described herein. In a particular embodiment, the instructions may reside completely, or at least partially, within the memory 106, the medium reader 112, and/or the processor 104 (see FIG. 1) during execution by the SOID 402.

According to exemplary embodiments, the instructions, when executed, may cause a processor embedded within the SOIM 406 or the SOID 402 to perform the following: defining a schema in a common manner and displaying the schema onto a GUI; causing any application included across a distributed set of applications to utilize the schema to describe an error associated with a downstream application such that root failing component associated with the error is always at a bottom error frame in a response; implementing a common structure for distributed error propagation in a chain of applications across the distributed set of applications in connection with the error message; generating error logs received from the chain of applications; storing the error logs in a centralized location accessible by all SRE users and application owners; calling a corresponding API to access the error logs from the centralized location and display the error logs onto the GUI; and automatically implementing a remedial algorithm to correct the root failing component of the error message identified in the error logs. According to exemplary embodiments, the processor may be the same or similar to the processor 104 as illustrated in FIG. 1 or the processor embedded within SOID 202, SOID 302, SOID 402, and SOIM 406.

According to exemplary embodiments, in defining the schema in a common manner, the instructions, when executed, may further cause the processor 104 to perform the following: defining standardized error schema independently by each application across the distributed set of applications.

According to exemplary embodiments, the instructions, when executed, may further cause the processor 104 to perform the following: calling corresponding API by each application to communicate error response to each other among the distributed set of applications.

According to exemplary embodiments, the instructions, when executed, may further cause the processor 104 to perform the following: standardizing the common structure for the distributed error propagation in a manner such that each application among the distributed set of applications can participate in the distributed error reporting while providing its own contextualization of the error message.

According to exemplary embodiments, the instructions, when executed, may further cause the processor 104 to perform the following: receiving consistent error frames from all downstream applications across the distributed set of applications that provide the error logs that describe what, where and when the error has occurred; and propagating the error to upstream applications across the distributed set of applications.

According to exemplary embodiments, the instructions, when executed, may further cause the processor 104 to perform the following: implementing an AI/ML algorithm to capture all error codes from the downstream applications in the chain of application; generating the error logs based on the captured error codes; and implementing a self-healing algorithm to correct the root failing component of the error message identified in the error logs.

According to exemplary embodiments as disclosed above in FIGS. 1-12, technical improvements effected by the instant disclosure may include a platform for implementing a specification, platform, language, and cloud agnostic SRE observability improving module configured to utilize standardized error codes and distributed error propagation for improving SRE observability, but the disclosure is not limited thereto. According to exemplary embodiments as disclosed above in FIGS. 1-12, technical improvements effected by the instant disclosure may include a platform for implementing a specification, platform, language, and cloud agnostic SRE observability improving module configured to: allow an SRE user via a graphical user interface (GUI), in order to diagnose a failure across a distributed set of applications, to view the end user business transaction failure message and receive the root failing component and actionable failure message, while the transaction is processed and moves across inter-connected applications and their components, to allow the SRE user to directly engage the accountable application SRE team and resolve the issue or open a ticket; beyond the actionable failure message, mark the flow of the user transaction across the applications; transmit a precise and sufficient error message to the GUI to enable the SRE user to pinpoint the failing application, the failing component and what can be done to resolve the failure; transmit consistent error frames from all downstream applications to the GUI to provide a comprehensive log of what, where, and when an error has occurred, etc., but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed;

rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for improving site reliability engineering (SRE) observability by utilizing one or more processors along with allocated memory, the method comprising:
   defining a schema in a common manner;
   causing any application included across a distributed set of applications to utilize the schema to describe an error associated with a downstream application such that a root failing component associated with the error is always at a bottom error frame in a response;
   implementing a common structure for distributed error propagation in a chain of applications across the distributed set of applications in connection with an error message;
   generating error logs received from the chain of applications;
   storing the error logs in a centralized location accessible by all SRE users and application owners;
   calling a corresponding application programing interface (API) to access the error logs from the centralized location; and
   automatically implementing a remedial algorithm to correct the root failing component of the error message identified in the error logs.

2. The method according to claim 1, wherein in defining the schema in a common manner, the method further comprising:
defining a standardized error schema independently by each application across the distributed set of applications.

3. The method according to claim 2, wherein the standardized error schema provides a set of guidelines and guardrails for standardizing error codes while still providing a flexibility to an application owner to define and manage the application owner's error codes.

4. The method according to claim 1, further comprising:
calling corresponding API by each application to communicate an error response to each other among the distributed set of applications.

5. The method according to claim 1, further comprising:
standardizing the common structure for the distributed error propagation in a manner such that each application among the distributed set of applications can participate in a distributed error reporting while providing its own contextualization of the error message.

6. The method according to claim 1, wherein the centralized location is a centralized server, or a centralized database, or a centralized memory.

7. The method according to claim 1, the method further comprising:
receiving consistent error frames from all downstream applications across the distributed set of applications that provide the error logs that describe what, where and when the error has occurred; and
propagating the error to upstream applications across the distributed set of applications.

8. The method according to claim 1, wherein the method further comprising:
implementing an artificial intelligence (AI)/machine learning (ML) algorithm to capture all error codes from downstream applications in the chain of applications;
generating the error logs based on the captured error codes; and
implementing a self-healing algorithm to correct the root failing component of the error message identified in the error logs.

9. The method according to claim 1, wherein the method further comprising: implementing an artificial intelligence (AI)/machine learning (ML) algorithm to capture all error logs, error codes, from downstream applications in the chain of applications; and implementing an inventory of previous remediations using a self-healing algorithm; and generating patterns of known error codes and error logs; and implementing a AL/ML logic which will use those known patterns to predict future error conditions and take preventative remedial steps to prevent the errors from occurrence.

10. A system for improving site reliability engineering (SRE) observability, the system comprising:
a processor; and
a memory operatively connected to the processor via a communication interface, the memory storing computer readable instructions, when executed, causes the processor to:
define a schema in a common manner;
cause any application included across a distributed set of applications to utilize the schema to describe an error associated with a downstream application such that a root failing component associated with the error is always at a bottom error frame in a response;
implement a common structure for distributed error propagation in a chain of applications across the distributed set of applications in connection with an error message;
generate error logs received from the chain of applications;
store the error logs in a centralized location accessible by all SRE users and application owners;
call a corresponding application programing interface (API) to access the error logs from the centralized location; and
automatically implement a remedial algorithm to correct the root failing component of the error message identified in the error logs.

11. The system according to claim 10, wherein in defining the schema in a common manner, the processor is further configured to:
define a standardized error schema independently by each application across the distributed set of applications.

12. The system according to claim 11, wherein the standardized error schema provides a set of guidelines and guardrails for standardizing error codes while still providing a flexibility to an application owner to define and manage the application owner's error codes.

13. The system according to claim 10, wherein the processor is further configured to:
call corresponding API by each application to communicate an error response to each other among the distributed set of applications.

14. The system according to claim 10, wherein the processor is further configured to:
standardize the common structure for the distributed error propagation in a manner such that each application among the distributed set of applications can participate in a distributed error reporting while providing its own contextualization of the error message.

15. The system according to claim 10, wherein the centralized location is a centralized server, or a centralized database, or a centralized memory.

16. The system according to claim 10, wherein the processor is further configured to:
receive consistent error frames from all downstream applications across the distributed set of applications that provide the error logs that describe what, where and when the error has occurred; and
propagate the error to upstream applications across the distributed set of applications.

17. The system according to claim 10, wherein the processor is further configured to:
implement an artificial intelligence (AI)/machine learning (ML) algorithm to capture all error codes from downstream applications in the chain of applications;
generate the error logs based on the captured error codes; and
implement a self-healing algorithm to correct the root failing component of the error message identified in the error logs.

18. A non-transitory computer readable medium configured to store instructions for improving site reliability engineering (SRE) observability, the instructions, when executed, cause a processor to perform the following:
defining a schema in a common manner;
causing any application included across a distributed set of applications to utilize the schema to describe an error associated with a downstream application such that a root failing component associated with the error is always at a bottom error frame in a response;

implementing a common structure for distributed error propagation in a chain of applications across the distributed set of applications in connection with an error message;

generating error logs received from the chain of applications;

storing the error logs in a centralized location accessible by all SRE users and application owners;

calling a corresponding application programing interface (API) to access the error logs from the centralized location; and automatically implementing a remedial algorithm to correct the root failing component of the error message identified in the error logs.

19. The non-transitory computer readable medium according to claim 18, wherein in defining the schema in a common manner, the instructions, when executed, cause the processor to further perform the following:

defining a standardized error schema independently by each application across the distributed set of applications.

20. The non-transitory computer readable medium according to claim 19, wherein the standardized error schema provides a set of guidelines and guardrails for standardizing error codes while still providing a flexibility to an application owner to define and manage the application owner's error codes.

* * * * *